Aug. 12, 1947.  R. T. CORNELIUS  2,425,459

SINGLE PHASE MOTOR STARTER CIRCUIT CONTROL

Filed Feb. 12, 1944

Inventor
Richard T. Cornelius

By *Caswell & Lagaard*
Attorneys

Patented Aug. 12, 1947

2,425,459

UNITED STATES PATENT OFFICE 2,425,459

SINGLE-PHASE MOTOR STARTER CIRCUIT CONTROL

Richard T. Cornelius, Minneapolis, Minn.

Application February 12, 1944, Serial No. 522,066

3 Claims. (Cl. 172—279)

My invention relates to electric motors having a starting winding and a running winding and particularly to devices for de-energizing the starting winding after the motor has been started.

An object of the invention resides in providing a starting winding circuit for the starting winding and in disposing a normally closed switch therein and in further providing an electromagnet for opening the switch after the motor has come up to a speed sufficient to cause the motor to run continuously.

An object of the invention resides in providing the electromagnet with a movable armature adapted to engage the switch and to open the same.

A feature of the invention resides in causing the armature to normally assume a position beyond its active position, whereby the electromagnet is rendered inoperative upon initial energization of the motor.

A still further object of the invention resides in providing thermally responsive means for moving the armature to its active position after the lapse of a period of time sufficient to start the motor, whereby the electromagnet may quickly operate to open the starting circuit.

An object of the invention resides in utilizing a thermally responsive member comprising a strip of bi-metal for moving the armature of the electromagnet.

An object of the invention resides in heating said thermally responsive member by means of the starting winding circuit.

A still further object of the invention resides in running the current of the starting winding circuit directly through the bi-metal for the purpose of heating the same.

Another object of the invention resides in constructing the strip of bi-metal U-shaped in form with spaced arms and a connecting portion and in rigidly supporting the ends of the arms opposite the connecting portion.

A feature of the invention resides in connecting the supported ends of the bi-metal in the starting winding circuit.

An object of the invention resides in utilizing the connecting portion of the thermally responsive member for moving the armature of the electromagnet.

Other objects of the invention reside in the novel combination and arrangement of parts and in the details of construction hereinafter illustrated and/or described.

In the starting of the ordinary single phase split phase electric motor, a starting winding and a circuit therefor is employed which circuit is temporarily closed during starting by means of a switch and a centrifugally operated device for operating the same. Such centrifugal devices have numerous moving parts which are subjected to appreciable wear during starting of the motor and which are relatively short lived. The present invention provides a construction by means of which the centrifugal device for operating the starting switch may be eliminated and which will function to open the starting circuit after the lapse of a period of time sufficient to bring the motor up to running speed.

Figure 1:
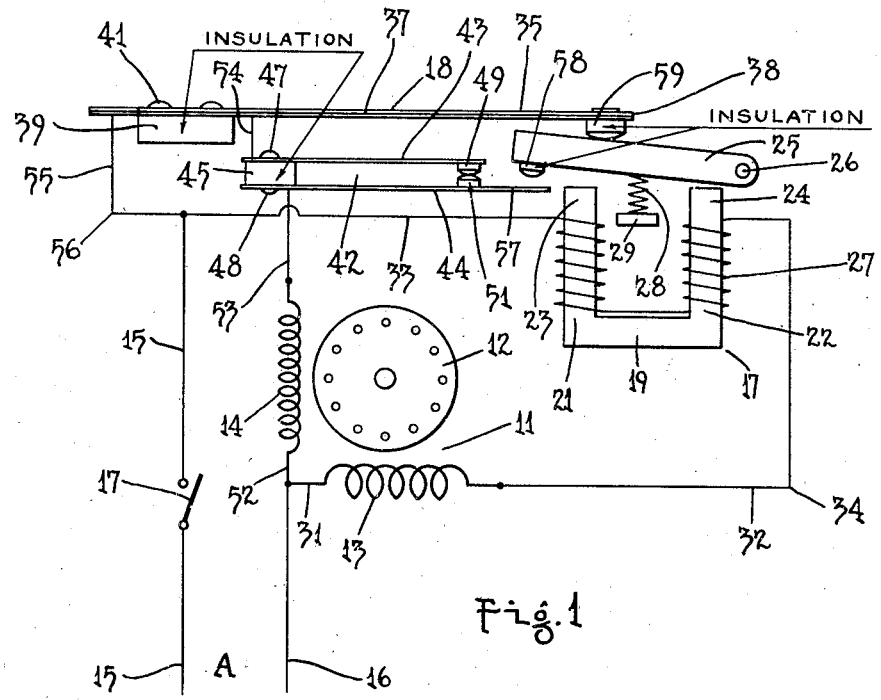
Fig. 1 is a wiring diagram illustrating an embodiment of my invention.

For the purpose of illustrating the invention, I have shown in diagrammatic form in Fig. 1 an electric motor 11 of ordinary construction. This electric motor is a single phase split phase motor and comprises a rotor 12, preferably of the squirrel cage type. Associated with this rotor is a running winding 13 and a starting winding 14. The motor 11 is illustrated as being energized from a line having sides 15—16 which line is connected to a suitable source of single phase alternating current. A manual switch 17 is connected in the side 15 of the line A and serves to initially energize the motor.

For controlling the energization of the starting winding 14, I employ a starting switch 42, an electromagnet for operating said switch designated by the reference numeral 17 and a thermally responsive member 18 controlling the operation of the said electromagnet. These parts will now be described in detail.

The electromagnet 17 consists of a core structure 19 provided with legs 21 and 22. These legs terminate in poles 23 and 24 which are adapted to be bridged by a movable armature 25 pivoted at 26 to the base or other supporting structure for the electromagnet. On the legs 21 and 22 is wound a winding 27 which serves to energize the electromagnet and when the armature 25 is positioned close enough to the poles 23 and 24 to attract said armature and move the same up to a position adjacent said poles. In the drawings, the armature 25 has been illustrated as positioned at a locality beyond its active position where attraction by the core structure 19 causes the armature to move toward the poles 23 and 24. A compression coil spring 28 acting against said armature and a fixed abutment 29 serve to urge the armature toward the position shown in Fig. 1.

The running winding 13 of motor 11 is connected by means of a conductor 31 with the side 16 of the line A and is connected by means of another conductor 32 with one end of the winding 27. The other end of the winding 27 is connected by means of a conductor 33 with the other side 15 of the line A. It will thus be seen that the winding 27 and the running winding 13 of the motor are simultaneously energized. The circuit in which the running winding 13 is disposed and which also includes the winding 27 has been designated as the running winding circuit of the invention and is designated in its entirety by the reference character 34.

Figure 2:
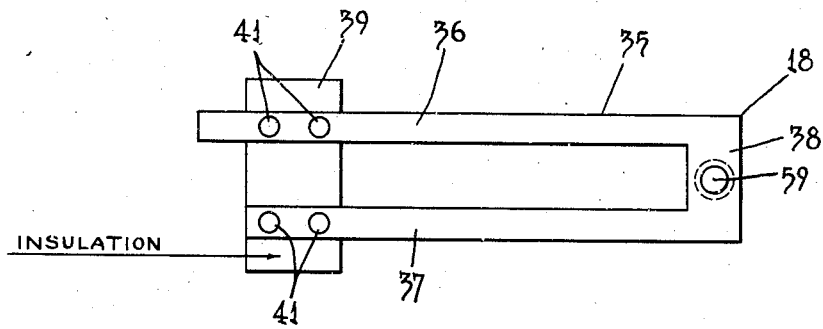
Fig. 2 is a plan view of the thermally responsive member used with the invention.

The thermally responsive member 18 consists of a strip of bi-metal 35, best shown in Fig. 2, which is of elongated U-shaped form. This thermally responsive member is provided with two legs 36 and 37 spaced from one another and connected together at one end of each leg by means of a connecting portion 38. The other ends of the said legs are secured to an insulating supporting block 39 by means of rivets or other fastener members designated at 41.

In conjunction with the thermally responsive member 18, a switch 42 is employed which consists of two leaves 43 and 44 attached to an insulating supporting block 45 by any suitable means as for example, rivets 47 and 48. The two leaves 43 and 44 have contacts 49 and 51 attached thereto and the said leaves are so tensioned that the contacts 49 and 51 are normally closed.

One end of the starting winding 14 of the motor 11 is connected by means of a conductor 52 with the side 16 of the line A. The other end of said starting winding is connected by means of a conductor 53 with the leaf 44 of the switch 42. The outer leaf 43 of said switch is connected by means of a conductor 54 with the arm 37 of the thermally responsive member 18. The other arm 36 of this thermally responsive member is connected by means of a conductor 55 with the other side 15 of the line A. In this manner, it will become apparent that the starting winding 14, the switch 42 and the thermally responsive member 18 are all connected in series in a circuit which I have referred to as the starting winding circuit and which is designated by the reference character 56.

The leaf 44 of the switch 42 is provided with an extension 57 which is adapted to be engaged by an insulating button 58 carried by the armature 25 of the electromagnet 17. This button is of such construction and the switch 42 is so located that the said switch becomes opened when the armature 25 reaches its attracted position at which said armature lies in closest proximity to the poles 23 and 24 of the core structure 19. When the armature 25 is beyond its active position, the button 58 is remote from the extension 57 and the armature moves for an appreciable distance before it actually commences to open the switch. The connecting portion 38 of the thermally responsive member 18 also has attached to it a button 59 of insulating material which is adapted to engage the armature 25 and to move the same from its operative or inactive position to a position such that the attraction produced by the core structure 19 will cause the armature to move toward the poles 23 and 24. As the thermally responsive member 18 is heated, due to the current in the starting winding circuit 56 passing through the same, the said thermally responsive member deflects downwardly as viewed in Fig. 1 and moves the armature 25 as described.

The operation of the invention is as follows:

Prior to closing the switch 17, armature 25, through the action of spring 28, assumes the position shown in Fig. 1. When so disposed, the button 58 is free from the extension 57 of switch 42 and the said switch remains closed. The thermally responsive member 18 also occupies the position shown in Fig. 1, which is such that the armature 28, whose movement is controlled by the button 59, lies outwardly beyond its active position. Upon closure of this switch 17, both circuits 56 and 34 become energized. Due to the fact that the armature 25 is disposed outwardly beyond its active position, the current going through the windings 27 is ineffective to attract the said armature and the electromagnet 17 is temporarily inactive. At the same time, current flows through the starting winding 14, the switch 42 and the thermally responsive member 18. Since both the windings 14 and 13 are energized, the motor commences to operate and picks up speed. While the motor is picking up speed, the thermally responsive member 18 is being heated by means of the current passing through the circuit 56. Upon heating of the thermally responsive member 18, the same deflects downwardly and commences to move the armature 25 from its inactive toward its active position. The time required for such movement is controlled by the proper design of the thermally responsive member 18 and is sufficient to give the motor an opportunity to come up to running speed. As soon as the armature 25 reaches its active position, the core 19 attracts the said armature with a snap action, bringing the armature into close proximity with the poles 23 and 24. When this occurs, the button 58 strikes the extension 57 of the leaf 44 of extension 42 and rapidly opens the circuit 56, thus de-energizing the winding 14. Due to the fact that the period required for bringing the motor up to speed is usually relatively short, the thermally responsive member 18 will have cooled sufficiently after the opening of the circuit 56, so that the same will be practically ready for reuse whenever it becomes desirable to again start the motor.

The advantages of my invention are manifest. With my invention, the troublesome centrifugal device operating the starting switch has been completely dispensed with and the movable parts reduced to a minimum. My invention is positive in action and exceedingly simple in construction. With my invention, there are no complicated parts to get out of order and the device will function indefinitely without attention.

Changes in the specific form of my invention, as herein described, may be made within the scope of what is claimed without departing from the spirit of my invention.

Having described my invention, what I claim as new and desire to protect by Letters Patent is:

1. An electric motor including a running winding circuit, a running winding in said circuit, a starting winding circuit, a starting winding in said starting winding circuit, a normally closed switch in said starting winding circuit, an electromagnet for operating said switch comprising a core formed with poles, a winding on said core connected in said running winding circuit and continuously energized during energization of said running winding, said electromagnet further including an armature movable toward and from said poles and normally positioned beyond its active position, said armature during movement from its active position to the poles of the core functioning to open the starting circuit switch with a snap action and a thermally responsive member connected in the starting winding circuit and adapted to be heated solely by means of the current flowing through the starting winding circuit, said thermally responsive member, during heating, moving said armature from its inactive position to its active position and initiating actuation of said switch by said armature, said thermally responsive member becoming deenergized upon opening of said switch and remaining deenergized during normal operation of the motor.

2. An electric motor including a running winding circuit, a running winding in said circuit, a starting winding circuit, a starting winding in said starting winding circuit, a normally closed switch in said starting winding circuit, a normally inoperable electromagnet for opening said switch and including a winding connected in said running winding circuit and continuously energized during energization of said running winding, and a thermally responsive member connected in said starting winding circuit and adapted to be heated solely by means of the current flowing through the starting winding circuit, said thermally responsive member upon becoming sufficiently heated rendering said electromagnet operable to open said switch, said thermally responsive member becoming deenergized upon opening of said switch and remaining deenergized during normal operation of the motor.

3. An electric motor including a running winding circuit, a running winding in said circuit, a starting winding circuit, a starting winding in said starting winding circuit, a normally closed switch in said starting winding circuit including a movable contact, an electromagnet for opening said switch and including a core having a winding thereon, said winding being connected in said running winding circuit and continuously energized during energization of said running winding, movable means associated with said core and including an armature and a thermally-responsive member for operating said armature, said armature being normally disposed beyond its active position and a lost-motion connection between said movable means and the movable contact of said switch, said thermally-responsive member being adapted to be heated solely by means of the current flowing through the starting winding and upon being heated, moving said armature to its active position and during such movement taking up the lost motion of said connection, said armature upon reaching such position being attracted by the core and opening said switch with a snap action, said thermally-responsive member becoming deenergized upon opening of said switch and remaining deenergized during normal operation of said motor.

RICHARD T. CORNELIUS.

REFERENCES CITED

The following references are of record in the file of this patent:

UNITED STATES PATENTS

| Number | Name | Date |
|---|---|---|
| 1,022,189 | Geissinger | Apr. 2, 1912 |
| 1,216,446 | Harrington | Feb. 20, 1917 |
| 2,175,032 | Schaefer | Oct. 3, 1939 |
| 1,802,804 | Burnham | Apr. 28, 1931 |
| 2,018,896 | Pearce | Oct. 29, 1935 |

FOREIGN PATENTS

| Number | Country | Date |
|---|---|---|
| 471,946 | Germany | Oct. 30, 1929 |
| 438,044 | Germany | Dec. 8, 1926 |